United States Patent
Mack et al.

Patent Number: 6,017,472
Date of Patent: Jan. 25, 2000

[54] METHOD OF FORMING PRODUCTS OUT OF VEHICLE TIRES

[76] Inventors: Daniel A. Mack; Marianne K. Mack, both of 859 Randall Dr., Troy, Mich. 48098

[21] Appl. No.: 09/097,981

[22] Filed: Jun. 16, 1998

[51] Int. Cl.⁷ .................................................. B29C 39/02
[52] U.S. Cl. .............................. 264/28; 264/115; 264/912
[58] Field of Search .............................. 264/28, 115, 912

[56] References Cited

U.S. PATENT DOCUMENTS

| | | | |
|---|---|---|---|
| 5,094,905 | 3/1992 | Murray | 263/115 |
| 5,316,708 | 5/1994 | Drews | 264/40.5 |
| 5,425,904 | 6/1995 | Smits | 264/115 |
| 5,523,328 | 6/1996 | Rosenbaum et al. | 264/912 |
| 5,575,966 | 11/1996 | Baatz | 264/912 |
| 5,714,219 | 2/1998 | Mashunkashey et al. | 264/912 |
| 5,800,754 | 9/1998 | Woods | 264/115 |
| 5,865,009 | 2/1999 | Jackson et al. | 264/912 |

*Primary Examiner*—Mary Lynn Theisen

[57] ABSTRACT

A new method of forming products out of vehicle tires for utilizing used vehicle tires in forming useful products. The inventive device includes the following steps: provide a supply of used vehicle tires. Freeze the tires. Remove steel belts from the tires. Shred the tires into a mixture. Add about twenty percent of new rubber to the mixture. Heat the mixture into a slurry form. Pour the slurry into a mold. Allow the slurry to dry within the mold into a form. Remove the form.

14 Claims, 2 Drawing Sheets

METHOD OF FORMING PRODUCTS OUT OF VEHICLE TIRES

BACKGROUND OF THE INVENTION

1. Field of the Invention

The present invention relates to used tires and more particularly pertains to a new method of forming products out of vehicle tires for utilizing used vehicle tires in forming useful products.

2. Description of the Prior Art

The use of used tires is known in the prior art. More specifically, used tires heretofore devised and utilized are known to consist basically of familiar, expected and obvious structural configurations, notwithstanding the myriad of designs encompassed by the crowded prior art which have been developed for the fulfillment of countless objectives and requirements.

Known prior art used tires include U.S. Pat. No. 4,851,500 to Lalwani et al.; U.S. Pat. No. 4,101,463 to Morgan et al.; U.S. Pat. No. 4,726,530 to Miller et al.; U.S. Pat. No. 3,273,807 to Wright; U.S. Pat. No. 1,181,967 to Curtis et al.; and U.S. Pat. No. 4,244,841 to Frankland.

While these devices fulfill their respective, particular objectives and requirements, the aforementioned patents do not disclose a new method of forming products out of vehicle tires. The inventive device includes the following steps: provide a supply of used vehicle tires. Freeze and/or shred the tires. Remove steel belts from the tires. Shred the tires into a mixture. Add about twenty percent of new rubber to the mixture. Heat the mixture into a slurry form. Pour the slurry into a mold. Allow the slurry to dry within the mold into a form. Remove the form.

In these respects, the method of forming products out of vehicle tires according to the present invention substantially departs from the conventional concepts and designs of the prior art, and in so doing provides an apparatus primarily developed for the purpose of utilizing used vehicle tires in forming useful products.

SUMMARY OF THE INVENTION

In view of the foregoing disadvantages inherent in the known types of used tires now present in the prior art, the present invention provides a new method of forming products out of vehicle tires construction wherein the same can be utilized for utilizing used vehicle tires in forming useful products.

The general purpose of the present invention, which will be described subsequently in greater detail, is to provide a new method of forming products out of vehicle tires apparatus and method which has many of the advantages of the used tires mentioned heretofore and many novel features that result in a new method of forming products out of vehicle tires which is not anticipated, rendered obvious, suggested, or even implied by any of the prior art used tires, either alone or in any combination thereof.

To attain this, the present invention generally comprises the following steps: provide a supply of used vehicle tires. Freeze and/or shred the tires. Remove steel belts from the tires. Shred the tires into a mixture. Add about twenty percent of new rubber to the mixture. Heat the mixture into a slurry form. Pour the slurry into a mold. Allow the slurry to dry within the mold into a form. Remove the form.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new method of forming products out of vehicle tires apparatus and method which has many of the advantages of the used tires mentioned heretofore and many novel features that result in a new method of forming products out of vehicle tires which is not anticipated, rendered obvious, suggested, or even implied by any of the prior art used tires, either alone or in any combination thereof.

It is another object of the present invention to provide a new method of forming products out of vehicle tires which may be easily and efficiently manufactured and marketed.

It is a further object of the present invention to provide a new method of forming products out of vehicle tires which is of a durable and reliable construction.

An even further object of the present invention is to provide a new method of forming products out of vehicle tires which is susceptible of a low cost of manufacture with regard to both materials and labor, and which accordingly is then susceptible of low prices of sale to the consuming public, thereby making such method of forming products out of vehicle tires economically available to the buying public.

Still yet another object of the present invention is to provide a new method of forming products out of vehicle tires which provides in the apparatuses and methods of the prior art some of the advantages thereof, while simultaneously overcoming some of the disadvantages normally associated therewith.

Still another object of the present invention is to provide a new method of forming products out of vehicle tires for utilizing used vehicle tires in forming useful products.

Yet another object of the present invention is to provide a new method of forming products out of vehicle tires which includes the following steps: provide a supply of used vehicle tires. Freeze and/or shred the tires. Remove steel belts from the tires. Shred the tires into a mixture. Add about twenty percent of new rubber to the mixture. Heat the mixture into a slurry form. Pour the slurry into a mold. Allow the slurry to dry within the mold into a form. Remove the form.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
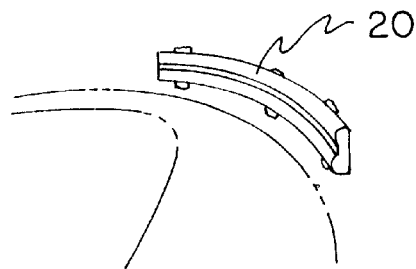
FIG. 1 is a perspective view of a new method of forming products out of vehicle tires according to the present invention illustrated in a form of a guard rail.
Figure 2:
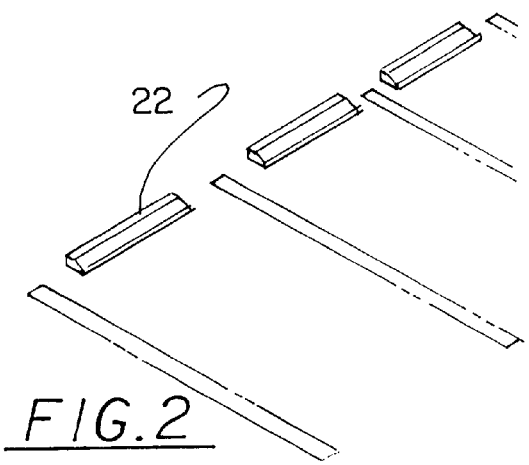
FIG. 2 is a perspective view of the present invention illustrated in a form of a parking lot curb.
Figure 3:
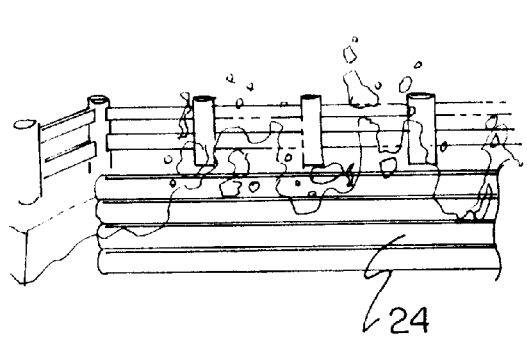
FIG. 3 is a front view of the present invention illustrated in a form of a sea wall.
Figure 4:
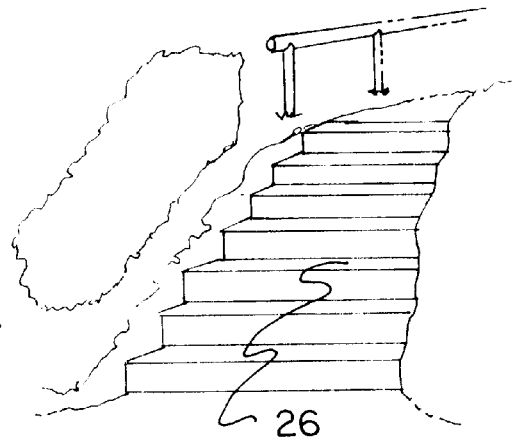
FIG. 4 is a front view of the present invention illustrated in a form of a stairway.
Figures 5, 6:
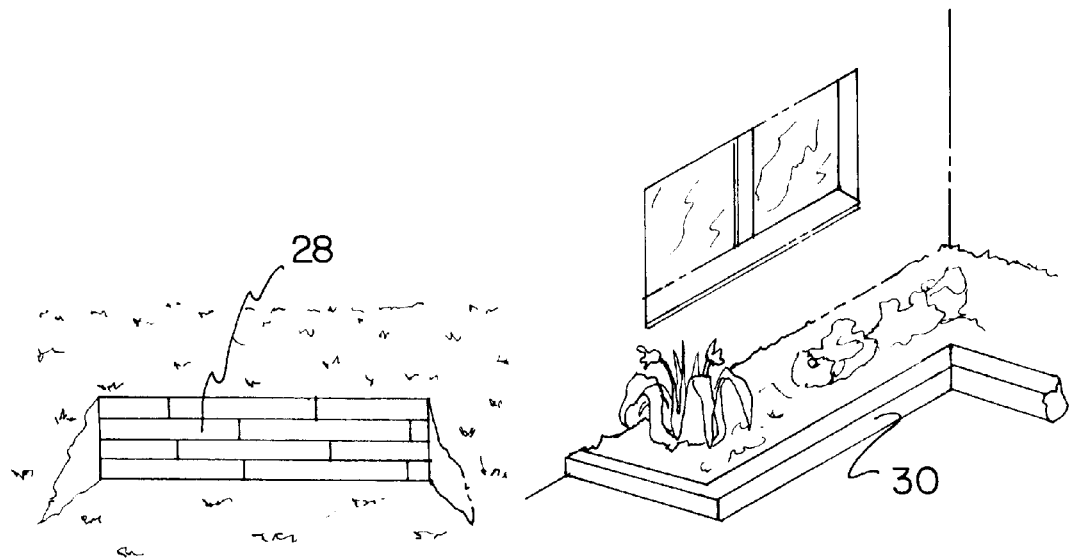
FIG. 5 is a front view of the present invention illustrated in a form of a retaining wall.
FIG. 6 is a perspective view of the present invention illustrated in a form of a landscaping edge wall.
Figure 7:
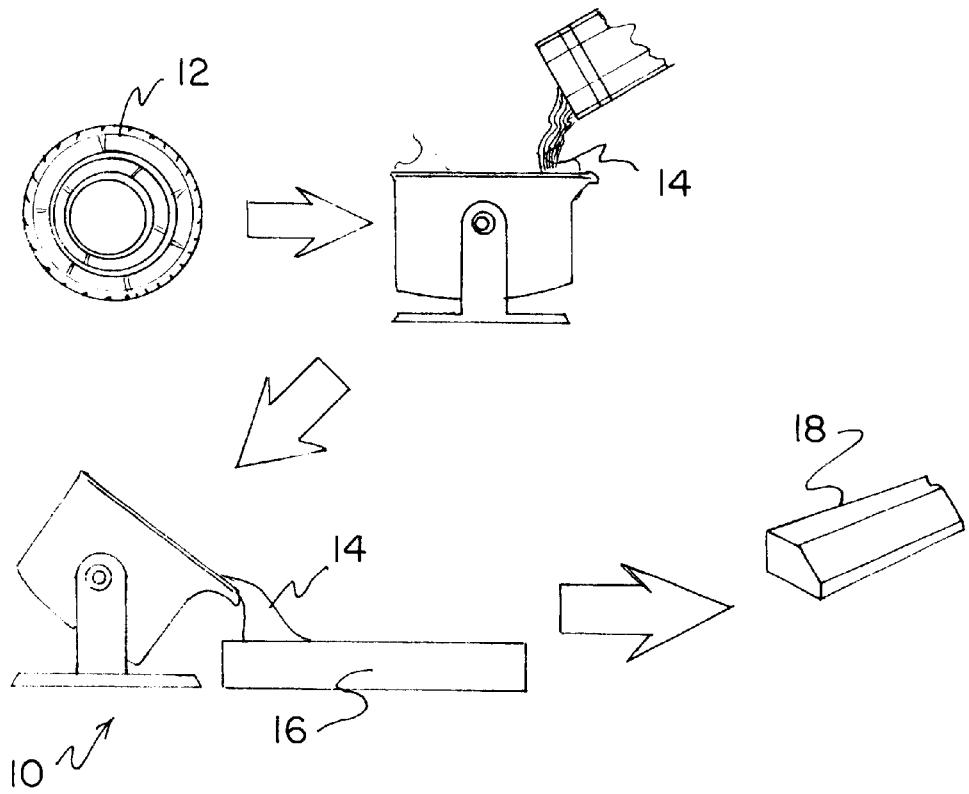
FIG. 7 is an illustration of a flow chart process of the present invention.

With reference now to the drawings, and in particular to FIGS. 1 through 7 thereof, a new method of forming products out of vehicle tires embodying the principles and concepts of the present invention and generally designated by the reference numeral 10 will be described.

As best illustrated in FIGS. 1 through 7, the method of forming products out of vehicle tires 10 comprises the following steps: provide a supply of used vehicle tires 12. Freeze the tires or shred the tires, or freeze and shred the tires. Remove steel belts from the tires. Shred the tires into a mixture. Add new rubber to the mixture. Preferably, about twenty percent of the mixture is new rubber after addition of the new rubber. Heat the mixture into a slurry form 14. Pour the slurry 14 into a mold 16. Allow the slurry 14 to dry within the mold 16 into a form 18. Remove the form 18.

The form 18 would be shaped for use as a guard rail 20, a parking lot curb 22, a sea wall 24, a stairway 26, a retaining wall 28, a landscaping edge wall 30, and a host of other possible products. Such products could make use of synthetic fiber reinforcements, such as rayon, nylon, Aramid, and/or polyester. These forms 18 could be produced in wide range of sizes.

In use, the various products formed could offer comparable levels of strength, impact-resistance, and durability. The use of the present invention could help reduce the volume of scrap tire currently not being used.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. A method of forming products out of vehicle tires for utilizing used vehicle tires in forming useful products comprising, in combination:

provide a supply of used vehicle tires;

freezing the tires;

removing steel belts from the tires;

shredding the tires into a mixture after freezing the tires;

adding about twenty percent of new rubber to the mixture;

heating the mixture into a slurry form;

pouring the slurry into a mold;

allowing the slurry to dry within the mold into a form; and removing the form.

2. The method of forming products out of vehicle tires as set forth in claim 1 wherein the form is a guard rail.

3. The method of forming products out of vehicle tires as set forth in claim 1 wherein the form is a parking lot curb.

4. The method of forming products out of vehicle tires as set forth in claim 1 wherein the form is a sea wall for providing a durable substantially waterproof wall adapted for retaining ocean waves from passing beyond a position of said sea wall.

5. The method of forming products out of vehicle tires as set forth in claim 1 wherein the form is a stairway.

6. The method of forming products out of vehicle tires as set forth in claim 1 wherein the form is a retaining wall.

7. The method of forming products out of vehicle tires as set forth in claim 1 wherein the form is a landscaping edge wall.

8. A method of forming products out of vehicle tires for utilizing used vehicle tires in forming useful products comprising, in combination:

providing a supply of used vehicle tires;

freezing the tires;

removing steel belts from the tires after freezing the tires;

shredding the tires into a mixture after removing the steel belts;

adding about twenty percent of new rubber to the mixture;

heating the mixture into a slurry form;

pouring the slurry into a mold;

allowing the slurry to dry within the mold into a form; and removing the form.

9. The method of forming products out of vehicle tires as set forth in claim 8 wherein the form is a guard rail.

10. The method of forming products out of vehicle tires as set forth in claim 8 wherein the form is a parking lot curb.

11. The method of forming products out of vehicle tires as set forth in claim 8 wherein the form is a sea wall for providing a durable substantially waterproof wall adapted for retaining ocean waves from passing beyond a position of said sea wall.

12. The method of forming products out of vehicle tires as set forth in claim 8 wherein the form is a stairway.

13. The method of forming products out of vehicle tires as set forth in claim 8 wherein the form is a retaining wall.

14. The method of forming products out of vehicle tires as set forth in claim 8 wherein the form is a landscaping edge wall.

* * * * *